MAGNETICALLY RECORDED DATA AND SYSTEM FOR READING SAME

Filed Oct. 16, 1958 10 Sheets-Sheet 1

INVENTORS.
WILLIAM L. POLAND
IVAN FLORES
GUSTAVE D. CERF
ROBERT M. MIHALEK
BY Isidore Match
ATTORNEY

MAGNETICALLY RECORDED DATA AND SYSTEM FOR READING SAME

Filed Oct. 16, 1958 10 Sheets-Sheet 2

INVENTORS
WILLIAM L. POLAND
IVAN FLORES
GUSTAVE D. CERF
ROBERT M. MIHALEK
BY Isidore Match
ATTORNEY INVENTORS
WILLIAM L. POLAND
IVAN FLORES
GUSTAVE D. CERF
ROBERT M. MIHALEK
BY Isidore Match
ATTORNEY INVENTORS
WILLIAM L. POLAND
IVAN FLORES
GUSTAVE D. CERF
ROBERT M. MIHALEK
BY Isidore Match
ATTORNEY INVENTORS
WILLIAM L. POLAND
IVAN FLORES
GUSTAVE D. CERF
ROBERT M. MIHALEK
BY Isidore Match
ATTORNEY INVENTORS
WILLIAM L. POLAND
IVAN FLORES
GUSTAVE D. CERF
ROBERT M. MIHALEK
BY Isidore Match
ATTORNEY INVENTORS
WILLIAM L. POLAND
IVAN FLORES
GUSTAVE D. CERF
ROBERT M. MIHALEK
BY Isidore Match
ATTORNEY INVENTORS
WILLIAM L. POLAND
IVAN FLORES
GUSTAVE D. CERF
ROBERT M. MIHALEK
BY Isidore Match
ATTORNEY

INVENTORS
WILLIAM L. POLAND
IVAN FLORES
GUSTAVE D. CERF
ROBERT M. MIHALEK

BY Isidore Match

ATTORNEY

MAGNETICALLY RECORDED DATA AND SYSTEM FOR READING SAME

Filed Oct. 16, 1958

INVENTORS
WILLIAM L. POLAND
IVAN FLORES
GUSTAVE D. CERF
ROBERT M. MIHALEK
BY Isidore Match
ATTORNEY

United States Patent Office 3,113,298

Patented Dec. 3, 1963

3,113,298

MAGNETICALLY RECORDED DATA AND SYSTEM FOR READING SAME

William L. Poland and Ivan Flores, Norwalk, Gustave D. Cerf, East Norwalk, and Robert M. Mihalek, West Redding, Conn., assignors to Sperry Rand Corporation, New York, N.Y., a corporation of Delaware Filed Oct. 16, 1958, Ser. No. 767,646
11 Claims. (Cl. 340—174.1)

This invention relates generally to character recognition systems. More specifically it relates to systems wherein documents bearing visually identifiable alphabetic and numeric characters may be directly machine-read and their intelligence automatically converted into a form suitable for computer processing.

Among the data ultimately processed by a computer there may normally be included such intelligence as entries on business records, invoices, receipts, checks, and other commercial paper, all of which must, of necessity, be readily visually identifiable so as to permit their daily human use. In preparing this data for computer processing, it has been necessary to employ human operators to read the intelligence from such raw material and prepare cards or tapes having that intelligence in some form of machine-recognizable code. This method is inherently slow, in that it limits the electronically functioning computer to human speeds, or else it requires a large number of human operators, thereby entailing considerable expense. Further, where intermediate human operation is required, transcription errors are generally introduced during the process of transcribing the normal document entries into machine-usable code, and elaborate, expensive, and time-consuming "error detection" devices and methods have been necessary to locate and correct these errors before they are introduced into the computer.

Various attempts have been made to solve this problem by providing devices which sense visually recognizable intelligence and which provide directly from the sensed intelligence, a machine-usable code. Such devices have employed photoelectric mosaics, whirling discs, flying spot scanners and the like to convert intelligence from the graphic form into electric signals. These devices have been, of necessity, complex, have involved intricate circuitry, and have provided less than acceptable reliability when the sensed document containing the intelligence in graphic form is worn, dirty, and/or heavily creased from normal use.

Also, attempts have been made to improve the performance of existing machine-reading devices by radically changing the format or configuration of the intelligence symbols used on business documents so as to present the information conveyed thereby in a form better adapted to be automatically machine-read. Heretofore, the stylization of these intelligence symbols has been accompanied by great disadvantages. To achieve such benefits as the simplification of reading-system circuitry or the reliability of reading-systems, intelligence symbols have had to be stylized to such an extent as to make them difficult to be recognized visually, and hence to make them unacceptable for normal commercial use.

Accordingly, it is an object of this invention to provide a document bearing information units which are configured so as to be readily visually identifiable as conventional intelligence symbols and to provide a unique array of magnetic areas for each unit which may be read by a magnetic sensing device to produce a characteristic electric signal therefrom.

A further object of this invention is to provide an improved system for directly machine-reading intelligence-bearing documents and for automatically obtaining therefrom electric signals representative of that intelligence in a form suitable for computer use.

A still further object of this invention is to provide a system for automatically machine-reading intelligence-bearing documents wherein intelligence is recorded both in a visually recognizable and a machine-recognizable form.

Another object of this invention is to provide a system for automatically machine-reading intelligence magnetically recorded on a document bearing corresponding visually identifiable intelligence.

Generally speaking, in accordance with the invention, a document is provided having intelligence printed on it which is capable both of being visually recognized and of being automatically read by a machine. This intelligence consists of one or more information units each comprising a first and a second portion. The first portion is configured so as to be readily visually identifiable as a conventional alphabetic or numeric character, while the second portion is configured so as to comprise at least one additional indicium. At least the second portion of each information unit is printed in magnetic ink so that the information unit provides an array of magnetic areas adapted to be read by a magnetic sensing device. Each different unit is provided with a unique array of such magnetic areas, different from the array of any of the other elements, so that each different unit will produce a distinct characteristic electric signal when sensed by the sensing device.

Also in accordance with the invention, there is provided a character reading system including a document comprising a support bearing information units printed thereon. Each information unit has a first portion configured so as to be readily visually identifiable as a conventional alphabetic or numeric character, and a second portion comprising at least one additional indicium. At least the second portion of each unit is printed in magnetic ink so that the unit provides an array of magnetic areas adapted to be sequentially read by a magnetic sensing device, each unit having a discrete magnetic array different from the array of any other unit. A magnetic sensing device is provided for sequentially reading the magnetic arrays of such units to produce respective different electric signals therefrom. The signals produced when a unit is sensed are applied to the input of means which, in response thereto, produces a regularly recurring, predetermined number of pulses. These recurrent pulses and the signals from the sensing device are applied as inputs to means adapted to produce an output upon each coincidence of such inputs thereto. The output thus produced from the last named means is in the form of a series of pulses, each pulse being substantially synchronous with an excursion of a chosen polarity of the signal produced by the sensing device. Each series of output pulses represents a sensed unit in binary form, each unit producing a unique pulse train characteristic thereto.

For a better understanding of the invention, together with other and further objects thereof, reference is had to the following description, taken in connection with the accompanying drawings.

In the drawings,

FIGS. 1*a*–1*f* show conventional intelligence symbols printed in magnetic ink and the same intelligence symbols printed in accordance with one embodiment of this invention, and also show the waveforms which are produced therefrom when they are sensed by a magnetic sensing device.

FIG. 2 shows an information element printed in accordance with another embodiment of this invention.

FIGS. 3*a*–3*g* show an information unit printed in accordance with still another embodiment of this invention and the waveforms which are produced therefrom.

Figure 9:
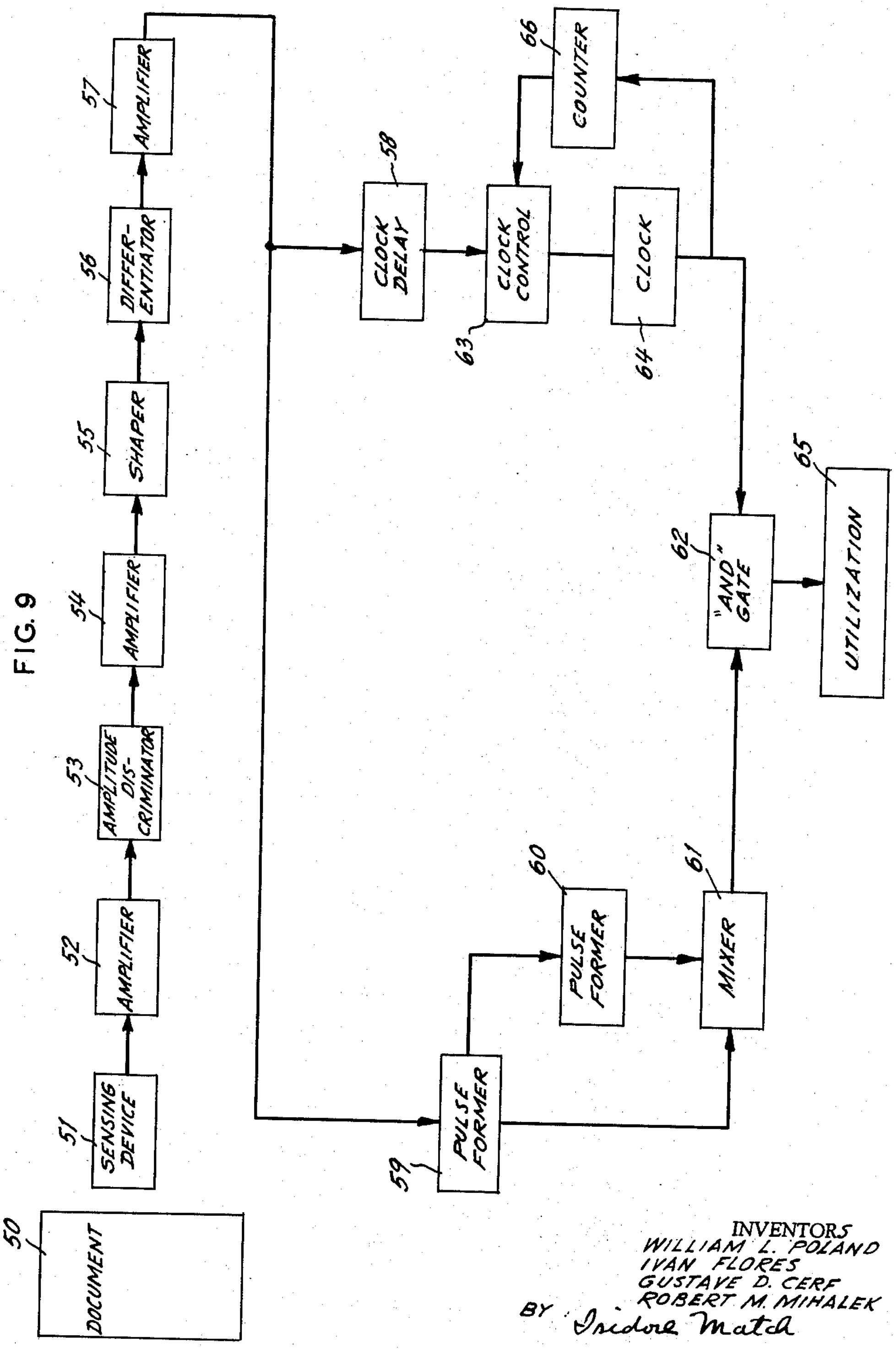
FIG. 9 is a structural block diagram of one embodiment of the logical device of FIG. 8.

FIGS. 11*a*–11*f* are a series of timing diagrams showing the waveforms at various points in the circuit shown in FIG. 9 when a character is being read.

Figure 12A:
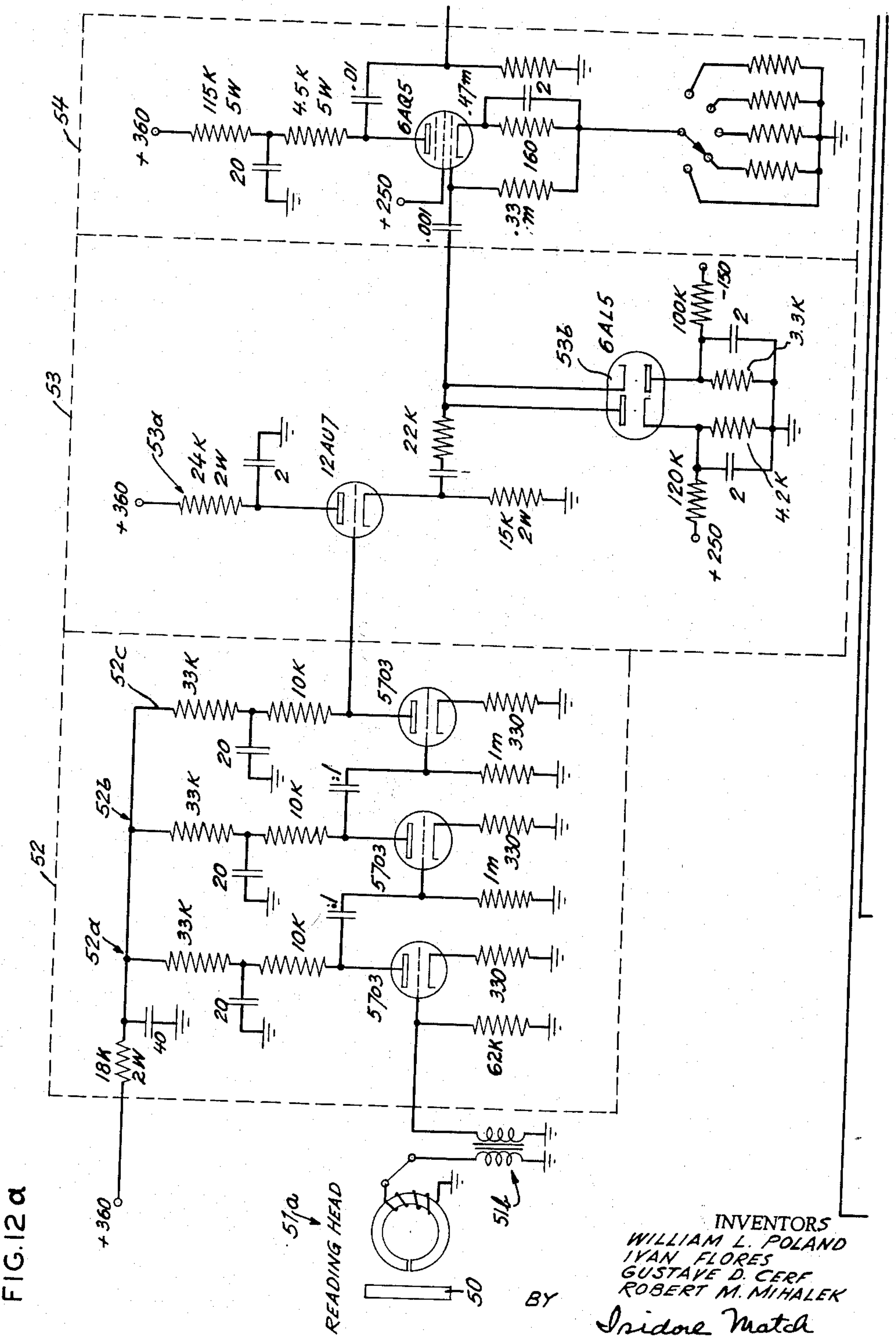
Figure 12B:
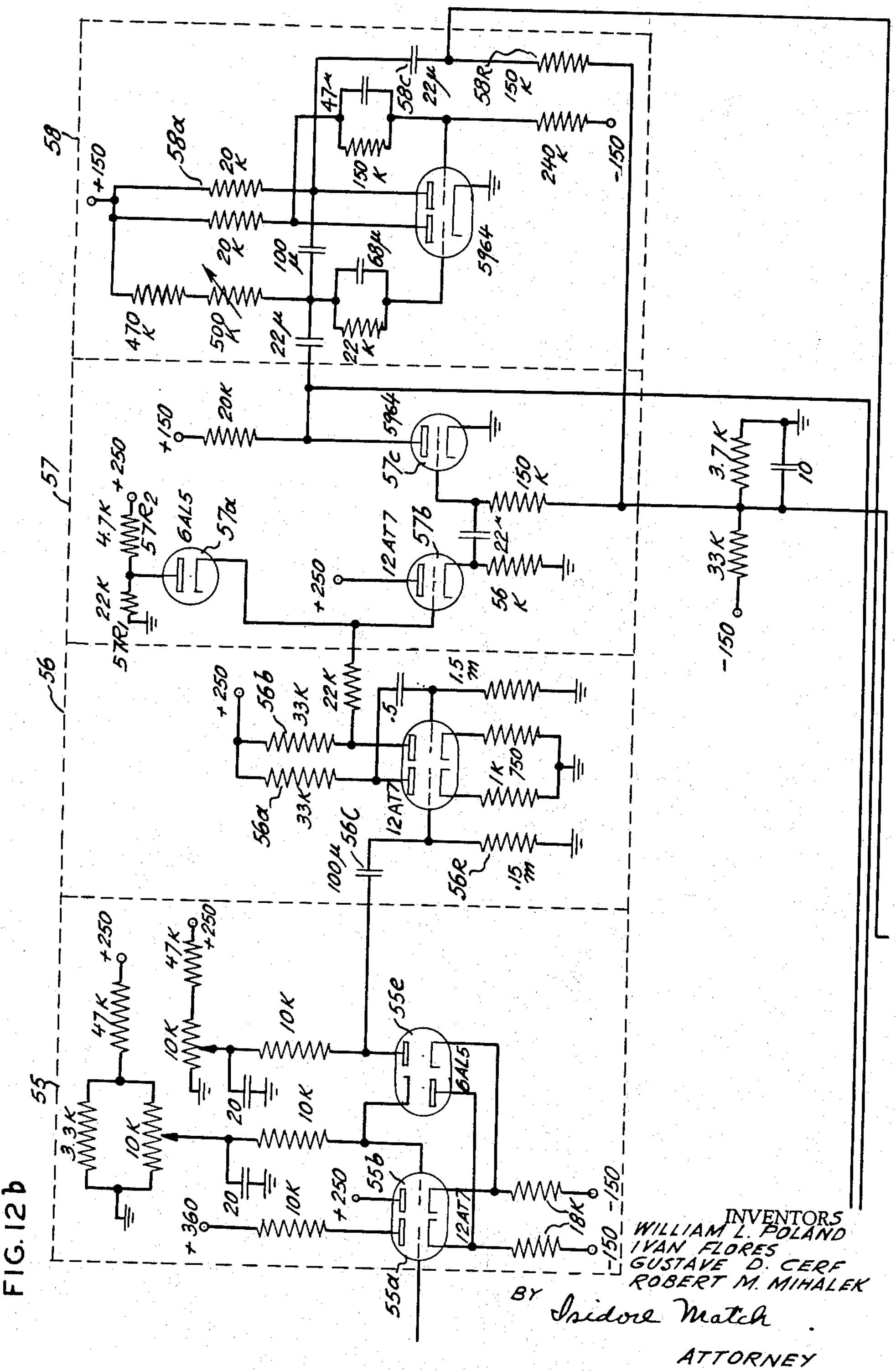
Figure 12C:
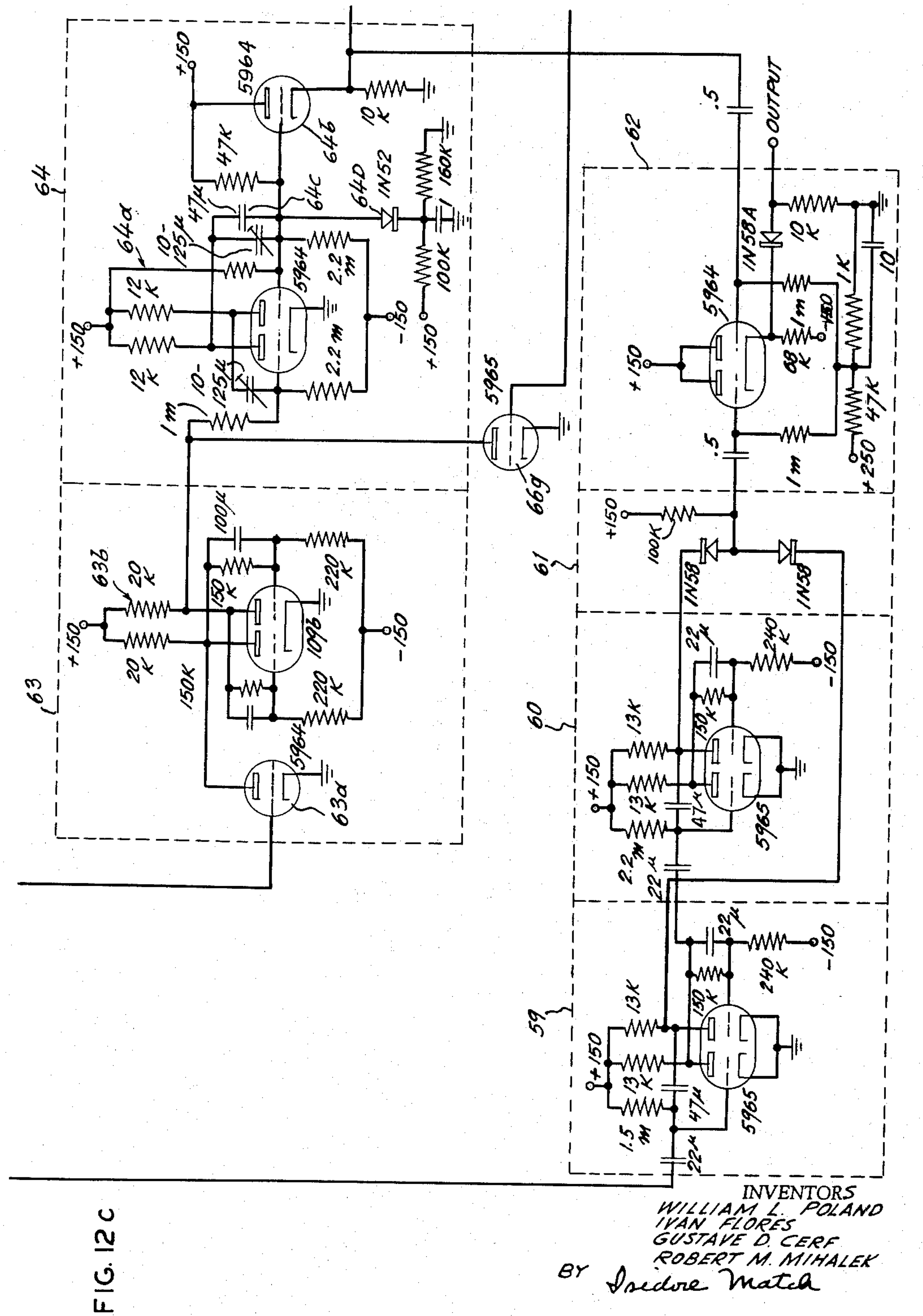
Figures 12D, 12E:
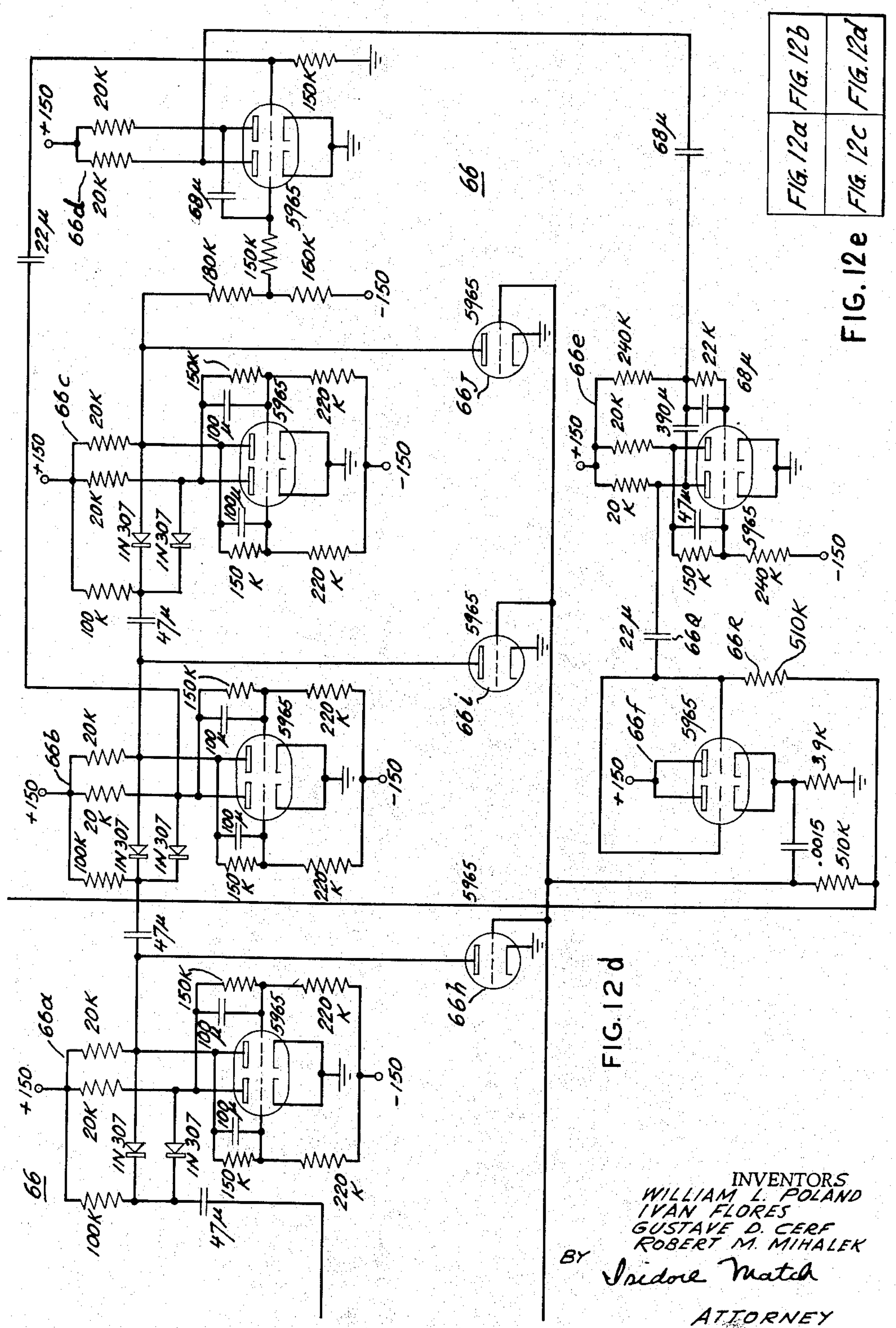

FIGS. 12*a*–12*d*, taken together in the manner shown in FIG. 12*e*, are a schematic diagram of one embodiment of the block diagram of FIG. 9.

Figure 1A:
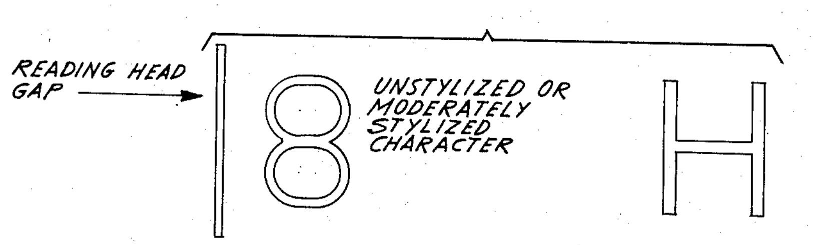

Referring now to FIG. 1, conventional intelligence symbols, such as arabic numeral "8" and letter "H" in FIG. 1*a*, are shown printed with magnetic material which, when magnetized by a magnetic field and sensed by a magnetic sensing head, in a manner well known in the art, will produce a characteristic waveform therefor as determined by the pattern of magnetic areas.

Figure 1B:
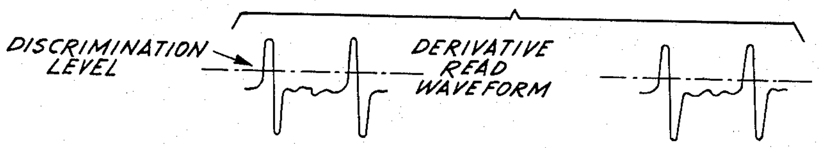
Figure 1C:
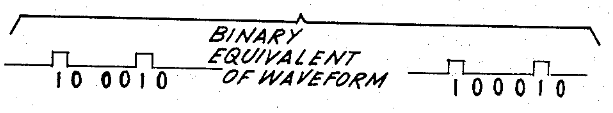

To permit ready machine recognition of these intelligence symbols, some arbitrary stylization is required therefor. It is advantageous to minimize such stylization as much as possible so that there may be clear-cut visual recognition of the symbols. However, there is a point at which some stylization is essential if the production of substantially similar waveforms for different intelligence is to be avoided. For example, the waveforms produced by sensing the symbols "8" and "H" of FIG. 1*a* are shown in FIG. 1*b*. It is to be noted that these symbols are depicted for convenience with the reading head moving from left to right. It is clear on inspection that they are essentially identical and that each has the same binary code equivalent, viz., 100010, as is shown in FIG. 1*c*.

Figure 1D:
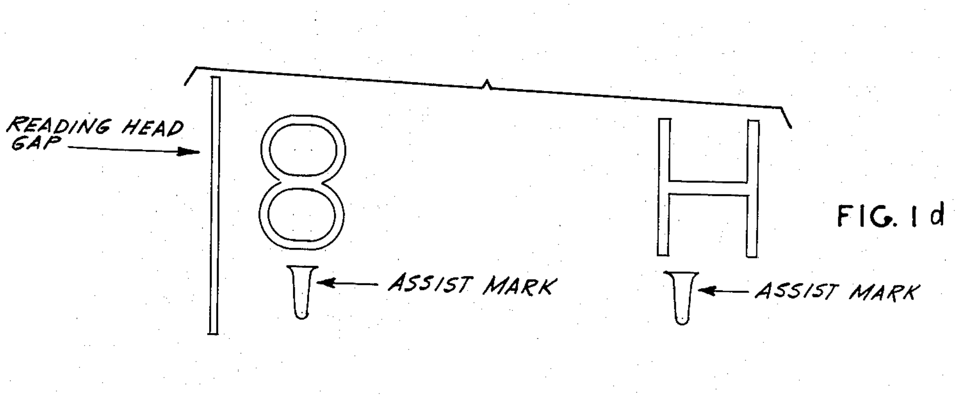
Figure 1E:
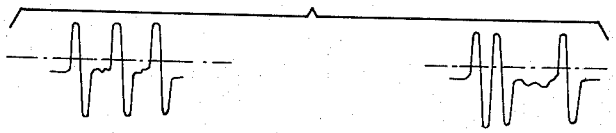
Figure 1F:
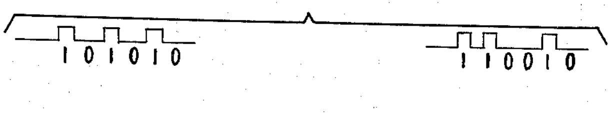

To preserve the visual recognizability of the intelligence symbols and at the same time to prevent the introduction of errors where different symbols produce effectively identical waveforms, a magnetic assist mark may be used in conjunction with some or all of the symbols, to insure that each information unit, when sensed, will produce a unique waveform. The assist mark, as it may be used with the characters "8" and "H," is shown in FIG. 1*d*. The waveforms produced when characters thus provided with assist marks are sensed, are shown in FIG. 1*e*, and the binary equivalents of the waveforms are represented in FIG. 1*f*. It is seen that the latter waveforms are clearly different from each other, and that the information represented thereby to be utilized in subsequent computer operation is unambiguous.

The assist mark thus enables the introduction of a signal where none would be present in an unstylized intelligence character symbol. It can also be used to increase the amplitude of an existing signal, thus improving the signal-to-noise ratio by increasing the amplitude of any existing weak signals. Further, more than one assist mark can be used in conjunction with any particular intelligence symbol, if that is required, and, of course, each assist mark can be one of many shapes.

In connection with the description of FIG. 1, and the figures to follow, it is to be understood that the magnetic material which comprises all or a part of a particular information unit must be magnetized before the information unit can be read by a sensing device. For example, the waveforms shown in the various figures will result if the printed magnetic material is magnetized by a fixed magnetic field from a head having the same general orientation as the reading head. By information unit is meant the visually recognizable intelligence symbol plus any additional indicia associated therewith.

Signals are derived by the sensing device when the document bearing information units thereon is moved relative to the sensing device, in the normal paper feed operation. This is clear from the showing in FIGS. 1*a*–1*f* and 3*a*–3*g*. This sequential or serial reading of information units is to be understood when discussion involves the production of signals by sensing with a magnetic sensing device.

Figure 2:
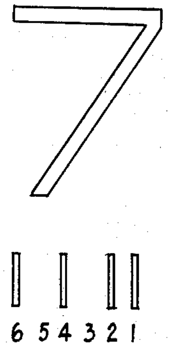

Referring now to FIG. 2, wherein there is shown another example of an information unit which is adapted to be read by the system to be described below, the information unit is recorded on a document having a first portion presenting the intelligence symbol in its normal, visually identifiable form as, for example, arabic numeral "7". The same numeral is represented on that document, immediately beneath the visually identifiable arabic numeral "7", in a chosen series of spaced, substantially parallel, vertical magnetic ink bars of substantially uniform width. The total number of magnetic ink bars utilized determines the number of code combinations possible, i.e. the number of intelligence symbols which can be represented. A limitation on the amount of bars which can be used and the number of code combinations possible is the amount of document space which can be allotted each symbol and the amount of discrete magnetic ink bars which can be included within such space without causing overprinting or confusion between adjacent bars. In the example shown in FIG. 2, and in conjunction with its use in the system to be described below, six possible bar positions have been provided, by way of illustration. Of these six positions, the first position has been chosen to be always occupied and serves to initiate the timing elements of the sensing systems. The remaining five bit positions are used for the recording of information, and effectively $2^5$, viz., 32 different intelligence symbols can be represented by the presence or absence of magnetic ink bars in one or more of the possible positions. FIG. 2 shows the pattern of magnetic ink bars chosen, for the purpose of illustration, to represent arabic numeral "7", wherein a bar is located in the first, second, fourth and sixth bar positions. This pattern, when sensed, provides the binary representation 110101, the reading head moving from right to left.

Figure 3A:
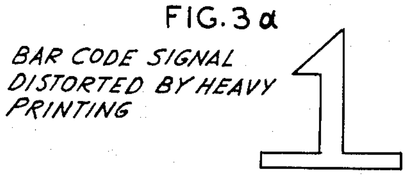
Figure 3E:
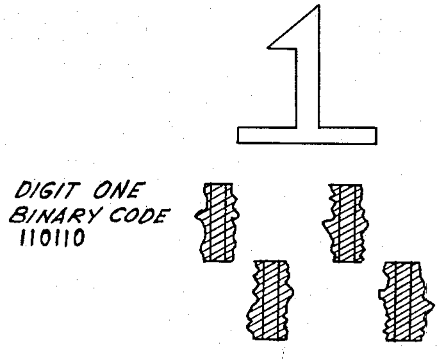
Figure 3B:
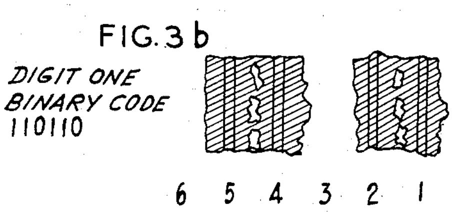
Figure 3C:
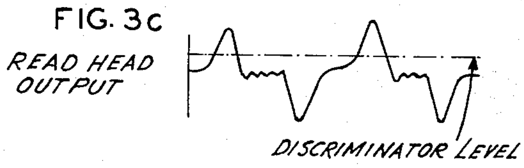
Figures 3F, 3G:
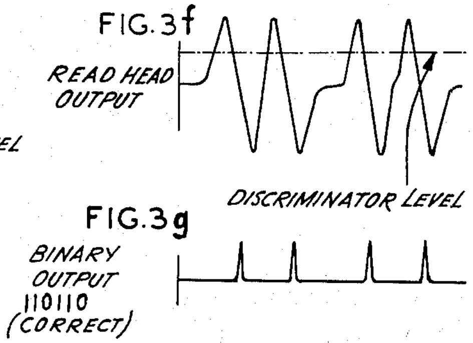
Figure 3D:
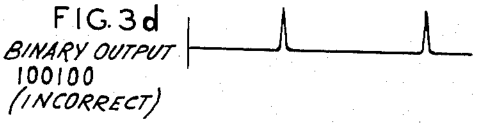

In FIGS. 3*a*–3*g*, wherein there is illustrated a variation of the information unit shown in FIG. 2, an information unit is shown which is configured so as to avoid the possibility of introducing erroneous information into the system as a result of magnetic ink overprinting and hence confusion between adjacent bars, when a symbol is sensed. In FIGS. 3*a* and 3*b* the arabic numeral "1" is represented as having the binary code 110110. A heavy magnetic imprinting of that code on a document to be sensed might produce the result illustrated in FIG. 3*b* if the magnetic material of adjacent bars overlapped instead of being confined to the area indicated by the solid lines. In such event the magnetic representation would produce, when sensed, a wave form such as that shown in FIG. 3*c* and hence would be incorrectly interpreted as the binary code 100100 as is shown in FIG. 3*d*.

In FIGS. 3*e* and 3*f* there is shown an alternate method of recording magnetic bits to prevent the production of such incorrect information. In these figures, the arabic numeral "1" is represented by the same number of magnetic bits, occupying the same respective bit positions as in FIG. 3*b*, but with the difference that adjacent bits are not in a single linear array. In FIG. 3*e*, the alternate bit positions are displaced so that two rows of bits are provided for each character. Of course, this necessitates an increase in the width which has to be covered by the sensing means, if the lengths of the bars remain unchanged, but as is readily seen, there is an appreciable gain in permissible magnetic ink recording density and, thus, in reliability. The wave forms produced from the sensing of arabic numeral "1", when coded as shown in FIG. 3*e*, are depicted in FIG. 3*f* and the binary output thereof is shown in FIG. 3*g*.

Figures 4, 5:
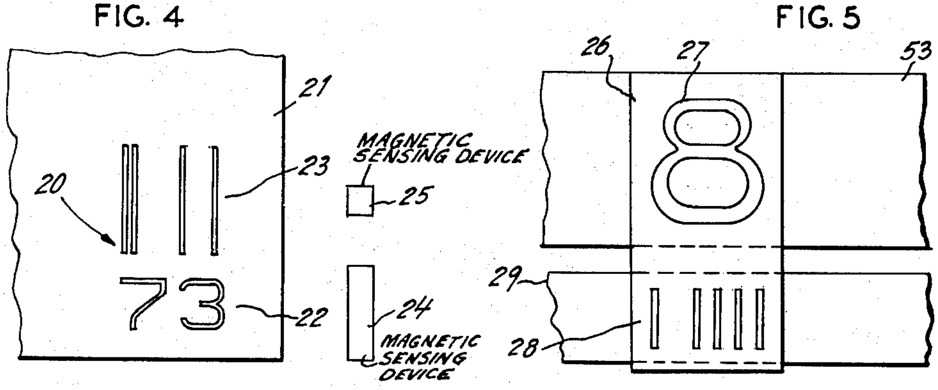
FIG. 4 shows an information unit printed in accordance with a further embodiment of this invention.
FIG. 5 shows a portion of apparatus for imprinting information units configured in accordance with this invention.

In FIG. 4 information units 20 representing arabic numerals "7" and "3" are shown recorded in magnetic ink on the surface of a document 21. Each information unit consists of a first portion 22 wherein the numeral is represented in its conventional, visually recognizable form, and a second portion 23 wherein a series of spaced, substantially vertical bars of substantially uniform width are provided, as described with reference to FIG. 2. Portion 22 of said information unit, printed in magnetic ink, need be only minimally stylized as shown in this figure, so that the first part thereof to be read by a magnetic sensing device of a document reading system, reading from right to left, provides a substantially vertical edge adapted to produce an electric signal in said device.

The embodiment shown in FIG. 4 is best employed with a reading system wherein two sensing devices are provided. A first such device, 24, positioned so as to read the said first or visually identifiable portion of the information unit, produces an electric signal when the leading edge of the character is read. This signal may be used to initiate a clock or timing circuit in the system. The second sensing device, 25, is positioned so as to read the said second part of each information unit, viz., the plurality of bars which represent the visually identifiable information in coded form, the first possible bar position, in the embodiment shown, being located directly above the leading edge of said visually identifiable portion.

By thus using the leading edge of the visually identifiable portion of each information unit as the initiating signal for the timing elements of the reading system, an additional bar position is available to convey intelligence in the second portion of each information unit, with no increase in the width allotted said information units, and no decrease in either interbar spacing or individual bar thickness, as compared to the code bars previously shown in and described with reference to FIG. 2. Thus if six bar positions are provided, the embodiment shown in FIG. 4 provides $2^6$, or 64 distinct bar patterns, whereas the form of FIG. 2 provides only $2^5$, or 32 such patterns, and the number of intelligence characters that can be encoded is doubled.

In printing certain of the information units described hereinabove, as for example the kind illustrated in FIGS. 2, 3 and 4, it is advantageous, when such units are read, that the magnetic ink be confined to the coded portion thereof.

Referring now to FIG. 5 wherein there is shown a portion of apparatus for printing information of the kind illustrated in FIG. 2, for example, member 26, schematically represents the type face of a standard typewriter keybar. Member 26 is shown as having a portion 27 intelligence symbol formed thereon, consisting of a conventional numeric or alphabetic character which in the embodiment shown is arabic numeral "8", and having a portion 28 therebelow comprising a series of bars representing that same character, as has been explained hereinabove.

A first ribbon 53, which may be of the usual non-magnetic typewriter kind, is mounted on the printing machine so as to be beneath portion 27 of member 26 and in cooperative relation therewith when the keyboard key controlling that member is depressed. A second ribbon 29, impregnated with an ink containing a magnetizable substance, is mounted so as to lie beneath and to cooperate with portion 28 of member 26, when the corresponding intelligence symbol is selected.

Figure 6:
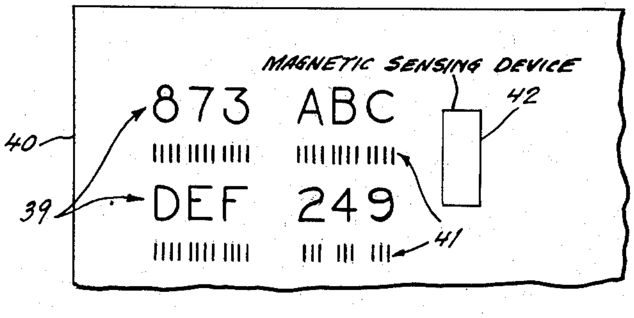
FIG. 6 shows a document which has been printed with the apparatus of FIG. 5.

In FIG. 6, two rows of information units 39, produced by printing with two ribbons as set forth in connection with the description of FIG. 5, are shown recorded on the surface of a support 40, such as a paper sheet, etc. The magnetic portion of each element, i.e., that which is printed with the ink containing the magnetizable substance, is confined to bar code area 41, since only the ribbon positioned to cooperate with portion 28 of member 26 (FIG. 5) is magnetically impregnated. A magnetic sensing device, indicated by block 42, is disposed so as to read the surface of support 40. Sensing device 42 preferably has a reading width somewhat larger than the maximum height of a magnetic bar and in the embodiment shown in this figure, such width not only encompasses such magnetic bar areas but may also overlap a part of the visually identifiable portion of the information unit read and a part of the visually identifiable portions of any information unit printed on the following line. The provision of this wide reading area of sensing device 42 results in extreme system tolerance for any skew or off-printing of the magnetic bars. This extreme tolerance is made possible since no confusing signals will be produced by the sensing device due to the presence of any magnetizable material in the visually identifiable portion of the information units.

Figure 7:
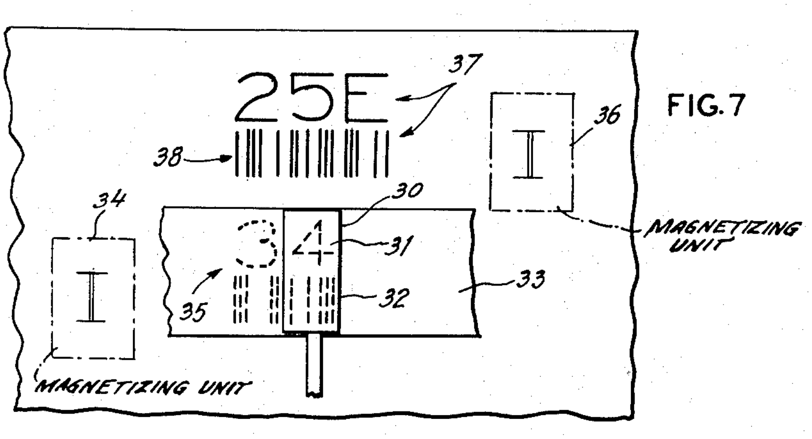
FIG. 7 shows a portion of further apparatus for imprinting information units configured in accordance with this invention.

Alternative apparatus for printing information units of the kind shown in FIG. 2, for example, where a single, magnetically inked ribbon is employed and yet the advantages mentioned hereinabove in connection with FIG. 5 are retained, is shown in FIG. 7. In FIG. 7, a member 30 schematically representing the type face of a standard typewriter keybar, for example, is shown as having an information unit formed thereon consisting of a conventional numeric or alphabetic character portion 31 and, therebelow, a code portion 32 containing one or more bars representing that same character, as has been explained hereinabove in connection with the description of FIG. 2.

A ribbon 33, impregnated with an ink containing a magnetizable substance, is mounted on a printing machine so as to lie beneath the entire type face of member 30, in cooperative relation thereto, when the keyboard key controlling that member is depressed. Immediately to the left of the point of print of member 30 is a first magnetizing unit 34, which in the embodiment shown may be a permanent magnet, mounted on the printing machine. Magnetizing unit 34 is so positioned that its operative surface is aligned with the row of characters 35 being typed at any time. The operative surface of magnet 34 is selected to be of a height substantially equal to the height of the code portion 32 of the information units. Magnetizing unit 34, positioned as shown, polarizes portions 32 of the information units after they have been typed, as the document which is being printed is advanced to the left by the conventional carriage escapement mechanism.

A second magnetizing unit 36, which is also shown as being a permanent magnet, is mounted on the printing machine to the right of the point of print of member 30. Magnetizing unit 36 is positioned so that its operative surface is aligned with a row of characters 37 a selected number of lines above the row being typed at any time, i.e., with a row typed prior to the row then being typed. Magnetizing unit 36 polarizes code portions 38 of row 37, as shown, to insure the magnetization of those information units which, when row 37 was typed, had not yet reached magnetizing unit 34, when the last information unit on that row was printed.

Magnetizing unit 36 may be in a fixed position relative to row 37, thus requiring a predetermined spacing distance between adjacent rows of characters, or, of course, unit 36 may be made to cooperate with the line shift mechanism of the printing machine so as to allow for varying amounts of spacing between such adjacent rows.

Figure 8:
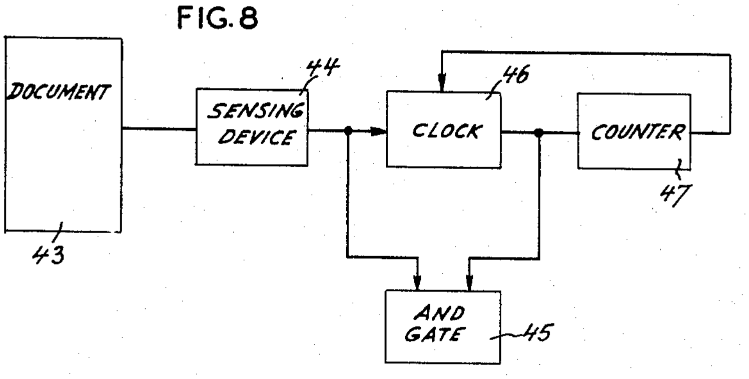
FIG. 8 is a logical block diagram of a device adapted to read documents which are imprinted with information units configured in accordance with this invention.

In FIG. 8, wherein there is illustrated in logical block form an embodiment of a system adapted to read information units printed in accordance with one of the embodiments described hereinabove, and to derive therefrom a machine-usable binary representation for each of said units, a document 43 bearing visually identifiable, magnetically coded information, such as is shown in FIG. 2, is positioned adjacent a sensing device 44. Sensing device 44 typically may be a magnetic read head of a type well known in the art, which detects variation in flux caused by the magnetically encoded information on document 10 and produces electric signals in response thereto. These signals are applied to one input of a gate 45 which may be any logical element which produces an output only upon coincidence of two inputs thereto.

The first signal produced at sensing device 44 when each character is sensed also serves as the initiating pulse for clock 46 in addition to being applied to one input of gate 45, the output from clock 46 serving to provide the other input to gate 45. The output from clock 46 is also applied to a counter 47 which may be a conventional binary counter which produces an output signal upon the completion of a predetermined number of inputs. This output signal serves as a terminating signal to cut off clock 46. In this embodiment, counter 47 is chosen to be a binary six counter so that clock 46 will apply an input to gate 45 for each of the six possible bit positions, before a terminating pulse is produced by the counter. In other words, if an *"n"* bit position code were used, then counter 47 would count *"n"* pulses before producing a terminating pulse to cut off clock 46.

The counter, clock, and gate of FIG. 8 provide synchronization of the information signal, i.e., the signals produced by sensing device 44, with the outputs from clock 46, and also correct for misalignment and skew resulting from imperfect printing of the characters, as will be more fully explained below.

Figure 11:
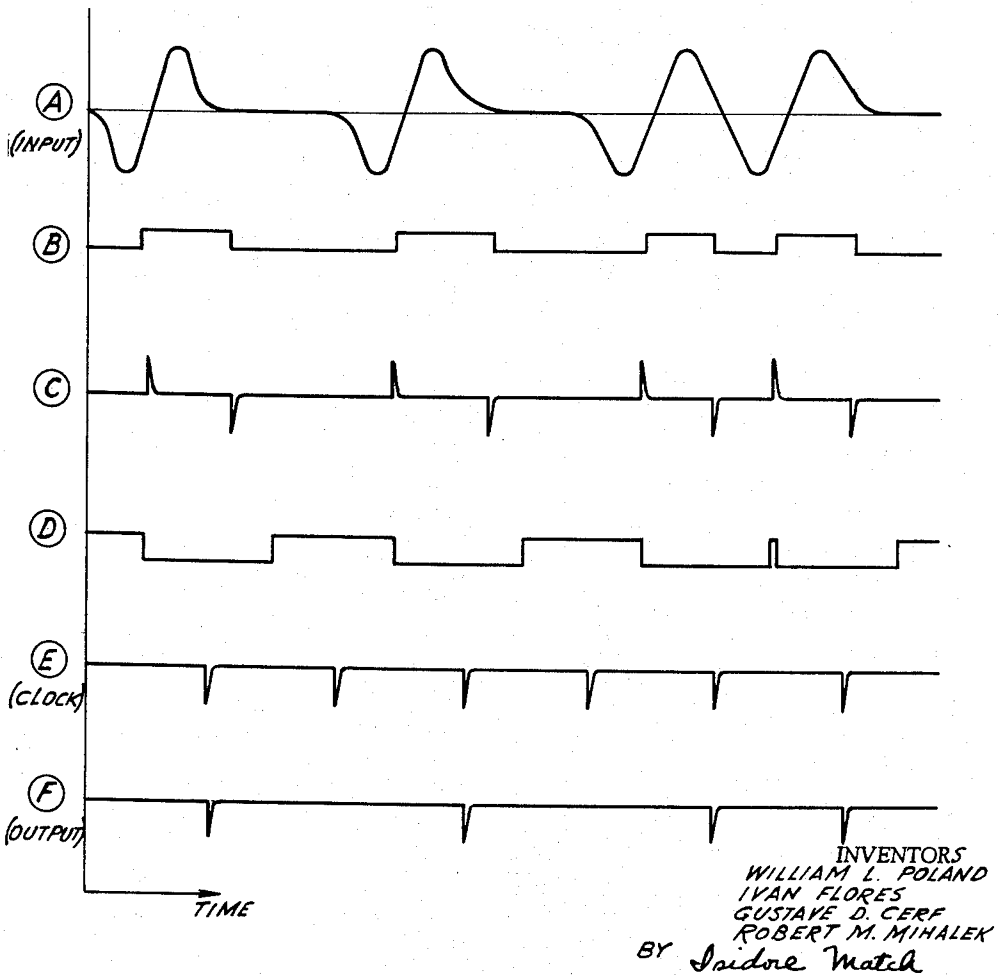

Referring now to FIG. 9 and the timing diagram of FIG. 11, a document 50 bearing information units of the type shown in FIG. 2, for example, is sensed by a sensing device 51 and the signals thus produced are applied to an amplifier stage 52. The output signals from amplifier stage 52 which have the configuration shown in line A of FIG. 11 are shaped in amplitude discriminator stage 53 to provide substantially rectangular pulses. These shaped output pulses are fed to a second amplifier stage 54 and the outputs therefrom are further squared in a shaper stage 55 to assume the form shown in line B of FIG. 11. The resulting output signals from shaper stage 55 are applied to a differentiator stage 56, to provide a sharply peaked signal corresponding to each square wave input thereto, as is shown at line C of FIG. 11. The output of differentiator stage 56 is applied to amplifier clipper stage 57, wherein the negative signals shown in line C of FIG. 11 are removed, and the further amplified, positive, peaked signals are fed to clock delay stage 58. At this point, the information sensed by sensing device 51 is represented as a single sharp positive pulse occurring approximately at the center of each corresponding information bar. The output from amplifier clipper stage 57 is also fed to a first pulse former stage 59 which produces, in response thereto, a negative output occupying a chosen percent of an allotted time unit, which in the embodiment shown may advantageously be about 80%. The output from pulse former stage 59 is applied to a second pulse former stage 60 which produces a negative output signal, in response thereto, the latter also occupying a chosen percent of the allotted time unit, such as 20%. The outputs from the two pulse former stages are combined in a mixer stage 61 to provide a "full-time" information bit, shown in FIG. 11 at line D, and this "full-time" bit is applied as one input of an "AND" gate 62. The two pulse formers, each covering a fraction of an alloted time unit, are provided so that there is sufficient time to permit them to return to their normal or quiescent stage, to prevent the ambiguity that might occur where one bar, and hence the peaked pulse produced thereat by differentiator stage 56, occurs too close to an immediately preceding pulse to permit such recovery were a single 100% pulse former used.

The output from clock delay stage 58 sets a clock control stage 63 to initiate the running of a clock 64. Clock 64 is thus actuated to produce a series of regularly recurring outputs which are applied as the other input to "AND" gate 62. These clock outputs are shown at line E of FIG. 11 and are in the form of regularly recurring negative peaked pulses, timed to occur approximately at the middle of the allotted time of each information bar position by the delay of stage 58, as will be further explained hereinbelow. Thus, there is provided an inherently wide tolerance for skew, misalignment or misprinting, since only a small portion at the center of each bit is used.

The output from "AND" gate 62 is shown at line F in FIG. 11. Examination of this output shows that only upon coincidence of an output from mixer 62 (line D, FIG. 11), and an output from clock 64 (line E, FIG. 11) applied to "AND" gate 62, will there be an output therefrom that will be delivered to a utilization device 65. Device 65 may be any apparatus such as a computer, data processing system, or the like.

The output of clock 64 is also applied to a counter stage 66 which in this embodiment is a binary six counter, but which can be used to count any number of pulses, one for each possible bit position, as determined by the desired complexity of the code. In counter 66, upon the sixth clock signal being applied thereto, an output pulse is produced therefrom which is applied to clock control 63. Clock control 63 produces a signal in response thereto, which in turn terminates clock 64. No output pulses are thereafter produced by clock 64 until the next input is applied to clock control 63 from clock delay 58, i.e., when the next character is sensed.

Figure 10:
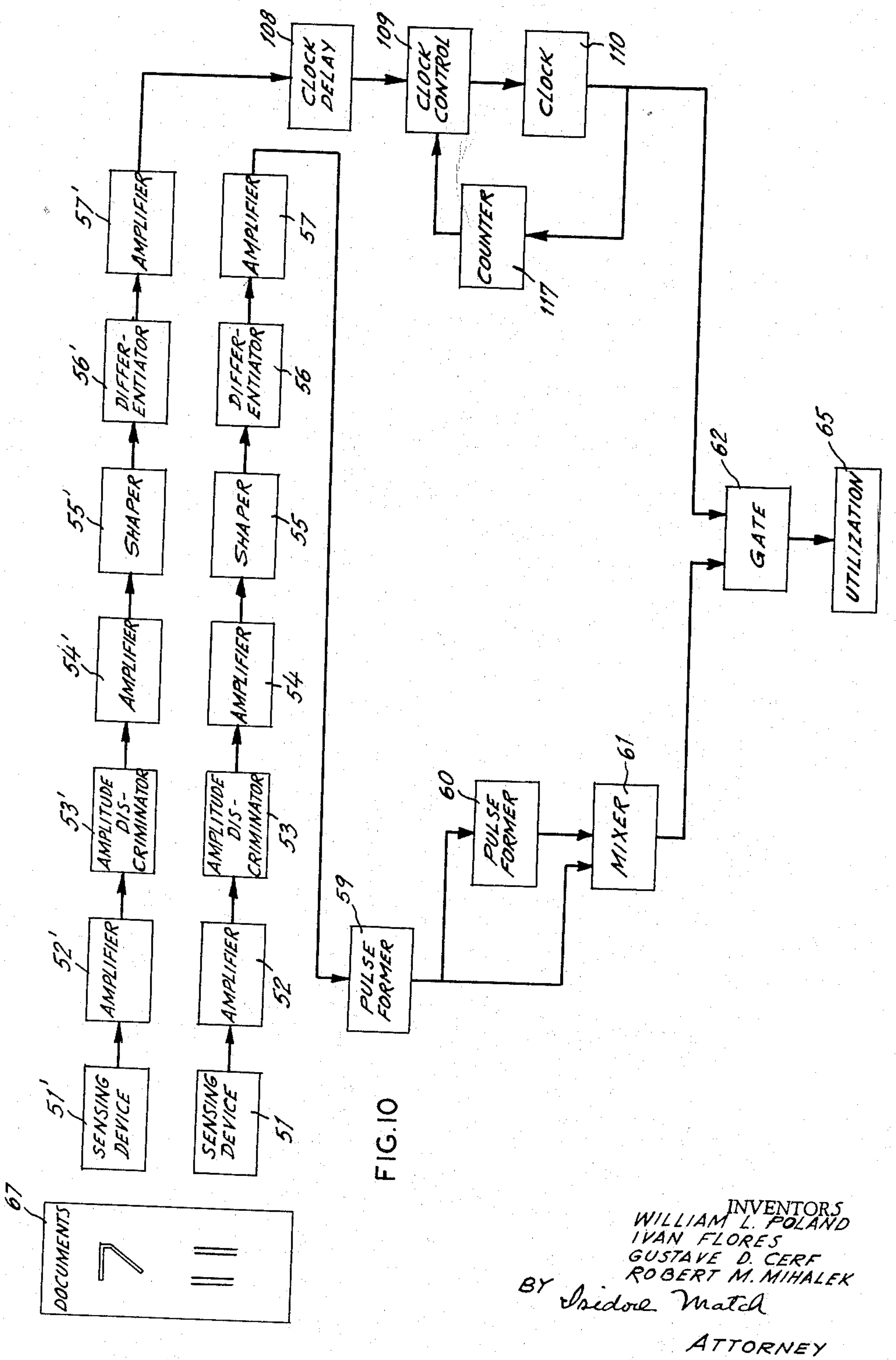
FIG. 10 is a structural block diagram of the logical device of FIG. 8 adapted to read documents imprinted with information units of the kind shown in FIG. 4.

In FIG. 10 wherein a document reading system is shown which is adapted to read information units of the kind shown in FIG. 4, structural block stages are designated by the same numerals as their counterpart structural block stages shown in FIG. 9. The operation of the circuit which is illustrated in this figure is substantially identical to that which is shown in FIG. 9 and described hereinabove with reference thereto, except that a second sensing device 51', and a second signal shaping portion of the system, which includes amplifier stage 52', amplitude discriminator stage 53', amplifier stage 54', shaper stage 55', differentiator stage 56', and amplifier stage 57', are provided. These stages, each operating identically to their respective counterparts shown in FIG. 9, produce a suitably shaped signal when sensing device 51' reads the leading, or right-hand edge of the visually identifiable portion of the information elements printed on document 67. The signal thus produced serves to initiate the timing portion of the system which portion includes stages 108, 109, 110, and 117. In all other respects the system shown in this figure is identical to that shown in FIG. 9.

In FIGS. 12*a–d*, which is a schematic diagram of an embodiment of the system shown in the structural block diagram of FIG. 9, the stages contained within the dashed lines are designated by the same numbers as their counterpart blocks in FIG. 9. Sensing device 51*a* in FIG. 12*a* is a magnetic read-head of a type well known in the art that detects changes in magnetic flux and produces electric signals in response thereto. As described in connection with FIG. 9, document 50 has information units thereon, such as those described in connection with FIG. 2. Signals produced by magnetic read-head 51*a*, and in the embodiment shown, preferably having an average peak-to-peak amplitude of about 130 microvolts, are applied to an input transformer 51*b* having for this embodiment a voltage step-up to about 8 millivolts. The output from transformer 51*b* is applied to an amplifier stage 52 which comprises three triode amplifier stages 52*a*, 52*b*, and 52*c*. These three amplifiers amplify the input signal by a factor of about 1000, and the substantially 8-volt output signals from amplifier stage 52*c* are applied to the control electrode of amplitude discriminator stage 53, the latter comprising a cathode follower stage 53*a* having its output connected to twin diode stage 53*b*. Amplitude discriminator stage 53 provides isolation and impedance matching by means of cathode follower 53a and with the circuit values shown in this figure for cathode follower 53a and twin diode 53b, limit the peak-to-peak amplitude of the voltage applied to the control electrode of variable gain amplifier stage 54, to 2 volts.

Variable gain amplifier 54 is of a type well known in the art, and with the circuit values shown, amplifies signals applied thereto by a factor of approximately 10. These amplified signals are applied to shaper stage 55 (FIG. 12b). Shaper stage 55 includes cathode followers 55a and 55b, and twin diode discriminator 55c, connected in the circuit as shown. The values shown for the circuit elements of stage 55 are so chosen that it will pass only that portion of the input signal applied thereto which has a value of between plus 4 and plus 6 volts. These substantially rectangular waves (see FIG. 11, line B), each representing one sensed information unit bar, are applied to differentiator stage 56 which consists of cascaded amplifiers 56a and 56b, resistance 56R, and capacitance 56C. The sharply peaked output pulses produced therefrom are applied to amplifier stage 57, the latter comprising diode 57a, cathode follower 57b, and amplifier 57c. Diode 57a removes the negative-going signals from stage 56 by clamping the grid input of cathode follower 57b to a minimum preselected positive value as determined by the B+ potential and resistances $57R_1$ and $57R_2$. The output of cathode follower 57b is applied to amplifier 57c which functions as an inverter amplifier. Each positive output signal appearing at the cathode of triode 57b, represents the presence of an information unit bar on document 50 sensed by read-head 51, and appear at the plate of amplifier 57c as negative signals.

These negative signals from amplifier 57c are applied to clock delay stage 58 and also to the first pulse former stage 59 shown in FIG. 12c. In the embodiment illustrated in this figure, stage 59 is a one-shot multivibrator, with values as shown selected to produce in response to each peaked negative input signal a negative-going rectangular wave output pulse occupying approximately 80% of the time allotted each information unit bar. In other words, if a chosen time is selected for each bar, the output of this multivibrator will have a pulse width approximately equal to 80% of that time.

The output from pulse former stage 59 is applied both to a second pulse former stage 60 which comprises a one-shot multivibrator similar to that described in connection with pulse former stage 59, and to a mixer stage 61. The circuit values of the multivibrator comprising stage 60, as shown, are chosen to provide negative output rectangular waves having a width approximately equal to 20% of the time allotted to an information bit. Mixer stage 61 comprises a pair of diodes which may be of the semi-conductor type. The output of pulse former stage 60 is also applied to mixer stage 61 and the output therefrom is applied as a first input to gate 62. As explained hereinabove, in connection with description of FIG. 9, pulse formers 59 and 60 are provided instead of one pulse former capable of producing a rectangular wave output having a width equal to substantially 100% of the time allotted to an information bit, in order to permit the one-shot multivibrators comprising stages 59 and 60 to flop back to their stable states. To explain this point further, let it be assumed that a heavy imprinting of a particular information bar, such as is illustrated in and described in connection with FIG. 3, for example, has consequently placed the effective center of that bar, and hence the differentiated pulse produced by differentiator stage 56, too close to an immediately preceding pulse. It is thus seen that the situation could arise where the multivibrator comprising pulse former stage 59, if it were the only one used, would be pulsed while still in the astable condition, but would not respond. By utilizing the two pulse former stages 59 and 60, this difficulty is substantially eliminated, and the pulse applied as the first input to gate 62 has a width substantially equal to 100% of the time allotted to the information bit.

Clock delay stage 58 (FIG. 12b), to which the output of amplifier 57c is also applied, as previously set forth, is part of a timing circuit which includes clock control stage 63, clock stage 64, and counter stage 66. Clock delay stage 58, shown as including a one-shot multivibrator 58a in this embodiment, produces a negative output substantially rectangular wave for the duration of its astable period. With the circuit values shown in the figure, the negative output of this one-shot multivibrator 58a is equal to approximately one half the time allotted each information bit. This negative output is differentiated by an RC circuit comprising a capacitance 58C and a resistance 58R. As a result thereof, a negative-going sharply peaked pulse is produced which is substantially coincident with the leading edge of the output signal from one-shot multivibrator 58a and a positive-going sharply peaked pulse is produced which is substantially coincident with its trailing edge. These pulses are applied to the input of a triode 63a of clock control stage 63 (FIG. 12c). Triode 63a, with the circuit values shown, is biased so as to respond only to a positive input thereto, and to produce a negative-going output at its plate as a result thereof. This latter output is applied to clock control flip-flop circuit 63b to switch its conductivity and thereby enable clock stage 64. By this arrangement, there is provided an effective delay in the application of the signal from inverter amplifier 57c to the input of clock stage 64 which is substantially equal to the negative output period of multivibrator 58a, viz., one half the time allotted each information bar. Thus the periodic pulses thereafter produced by clock stage 64 are located at the approximate center of each period allotted to an information bar.

Flip-flop 63b is a bistable switching circuit, and in response to the plate triggering of triode 63a, its conductivity state is switched from right to left. The positive output thereby produced at the right plate of flip-flop 63b is applied to clock stage 64, which may include a free-running multivibrator 64a and a cathode follower 64b as shown. With the circuit values indicated, clock stage 64 produces regularly recurring negative-going pulses from the left plate of multivibrator 64a which are differentiated by capacitance 64C and diode 64D, the positive-going pulses provided by such differentiation being removed through the action of diode 64D. Clock stage 64 will continue to run until the conductivity state of flip-flop 63b is switched back from left to right.

The negative-peaked output pulses from clock stage 64 are applied as a second input to "AND" gate 62, and are also applied to a counter stage 66 (FIG. 12d). In the embodiment shown in this figure, counter stage 66 is a six-pulse binary counter of a type well known to the art, comprising three flip-flop circuits, 66a, 66b, and 66c connected in cascade, a gate 66d, a reset generator 66e, a cathode follower 66f, and reset control triodes 66g, 66h, 66i, and 66j.

Counter flip-flop circuits 66a, 66b and 66c are so chosen, with the circuit values indicated, as to switch their respective conductivity states only in response to negative inputs applied thereto. To understand the operation of the counter, let it be assumed that at the start of the sensing of a character, counter flip-flop circuits 66a, 66b, and 66c are all conducting on the right. The first input to the counter from clock stage 64 switches the conductivity state of flip-flop 66a, causing it to conduct on the left. This change in the conductivity state of flip-flop 66a produces a positive output at its right plate, and flip-flops 66b and 66c are therefore not switched. Following through with the operation of the counter, it is seen that at the end of the fifth pulse from clock stage 64, flip-flops 66a and 66c will be conducting on the left, and flip flop 66b will be conducting on the right. Gate 66*d*, with the circuit values shown, is biased so as not to give an appreciable output from its left plate unless it simultaneously receives both a suitable positive signal at its left grid divider and a suitable positive signal to its left grid. On the sixth pulse from clock stage 64, flip-flop 66*c* remains conductive on the left. At this time, the input to the right grid of gate 66*d* becomes negative while the input to the left grid divider thereof remains high, these inputs producing a relatively high negative output from the left plate of gate 66*d*.

This negative output from gate 66*d* is applied to reset generator 66*e*, which may be a one-shot multivibrator as shown. In response thereto, reset generator 66*e* produces a substantially rectangular negative-going pulse at its left plate during its astable period, for a chosen duration. This output is differentiated by the RC circuit comprising a capacitance 66Q and a resistance 66R to produce a negative going peaked pulse substantially coincident with the leading edge of the negative output from reset generator 66*e* and a positive-going peaked pulse substantially coincident with the trailing edge thereof.

The differentiated pulses are applied to the grid or cathode follower 66*f*, which is so biased, with the circuit values shown, as to respond only to a positive-going pulse. The positive output of cathode follower 66*f* is applied to reset control triodes 66*g*, 66*h*, 66*i*, and 66*j* respectively, producing negative-going signals at the plates thereof. As a result of the action of reset control triode 66*g* (FIG. 12*c*), the conductivity of clock control flip-flop 63*b* is switched so that it again conducts on the right, thereby cutting off multivibrator 64*a* of clock stage 64 to terminate further clock outputs. The negative output at the plates of reset control triodes 66*h*, 66*i*, and 66*j* respectively (FIG. 12*d*) insure that each of flip-flops 66*a*, 66*b*, and 66*c* have their conductivity switched to the right so that they are conditioned for the start of the next count, which is initiated when the next character is sensed.

Ideally, the pulses from clock stage 64 should be applied to the second input of gate 62 at the center of the time allotted for each information bit. By the use of clock delay stage 58 and by employing as the output from clock state 64, sharply peaked differentiated pulses which occupy only a small fraction of each cell time, while at the same time permitting the information pulses to occupy 100% of their allotted cell time, an inherently wide system tolerance for distortions caused by misalignment, skew, and the like, in the printing of documents to be sensed is provided. Also, as set forth hereinabove, only the trailing edge of the output from reset generator 66*e* is utilized, since cathode follower 66*f* is biased to respond only to positive inputs, and this delay is so chosen that the pulses from cathode follower 66*f* occur, in time, after clock stage 64 has produced a complete signal pulse.

Outputs from gate 62, occurring upon each coincidence of an input from clock stage 64 and an information signal from mixer stage 61, appear as negative-going, time-aligned, peaked pulses, a unique characteristic train of pulses resulting from each individual sensed information unit. These pulse trains may be stored in a temporary storage device such as a shifting register and read out by the signal from reset generator 66*e* which is produced at the end of the sensing of each information unit.

While there have been shown and described certain preferred embodiments of the invention and the best mode in which it is contemplated employing that invention, it should be understood that modifications and changes may be made without departing from the spirit and scope thereof, as will be clear to those skilled in the art.

What is claimed is:

1. A document having intelligence thereon which is capable of being visually recognized and of being automatically read by a machine comprising a non-magnetizable support having information units magnetically printed thereon, each of said units being configured so as to be readily visually identifiable as a conventional alphabetic or numeric character and to provide a pattern of vertical magnetic areas adapted to be sequentially sensed by a single magnetic sensing device, selected ones of said units having at least one additional magnetic mark positioned to be sensed by said single magnetic sensing device, the signal provided by said additional magnetic mark adding to or subtracting from the signals provided by said visually identifiable portion of said unit whereby each discrete unit produces a unique electric signal when sequentially sensed by said device.

2. A document reading system including in combination a document having a non-magnetizable support bearing information units printed thereon, each of said units comprising first and second portions, said first portion of each unit being configured so as to be visually identifiable as a conventional alphabetic or numeric character, said second portion of each unit comprising at least one additional indicium, at least said second portion being printed in magnetic ink to provide an array of magnetic areas adapted to be sequentially sensed by a single magnetic sensing device, each unit having a discrete array different from the array of any other unit, and a machine for reading said document comprising a magnetic sensing device for sequentially sensing said magnetic arrays of each of said units to produce respective different electric signals therefrom, means having its input coupled to the output of said sensing device for producing a regularly recurring, predetermined number of pulses in response to an input thereto, and means for producing an output in response to the coincidental application thereto of portions of said electric signal and one of said recurring pulses, whereby a pulse train is produced which is substantially synchronous with the output from said sensing device and which represents a sensed unit in binary form, each different magnetic array providing a different pulse train.

3. A document reading system including in combination a document having intelligence thereon which is capable of being visually recognized and of being automatically read by a machine comprising a non-magnetizable support having information units printed thereon, each of said units being configured so as to be visually recognizable as a conventional alphabetic or numeric character and printed in magnetic ink so as to provide a vertical array of spaced magnetic ink areas adapted to be sensed by a single magnetic sensing device, selected ones of said units having at least one additional magnetic ink mark whereby each different unit produces a distinct characteristic electric wave when sensed by a sensing device, and a machine for reading said documents comprising a single magnetic sensing device for sequentially sensing said vertical magnetic array of each of said units to produce respective different electric signals therefrom, means having its input coupled to the output of said sensing device for producing a regularly recurring, predetermined number of pulses in response to an input thereto, and means for producing an output in response to the coincidental application thereto of a portion of said electric signal and one of said recurring pulses, whereby a series of pulses is produced which is substantially synchronous with the output from said sensing device and represents a sensed unit in binary form, each different magnetic array providing a different pulse train.

4. A document reading system including in combination a document comprising a non-magnetizable support bearing information units printed thereon, each of said units being allotted substantially equal widths on said support, a portion of each of said units being configured so as to be readily visually identifiable as a conventional alphabetic or numeric character, a second portion of each of said units comprising a linear array of one or more substantially vertical, spaced magnetic ink bars of substantially uniform breadth adapted to be sequentially read by a single magnetic sensing device, each of said bars being positioned on one of a predetermined number of equispaced positions within each of said widths, the presence of magnetic bars at chosen positions in each of said widths providing a binary form for the corresponding visually identifiable portion of each of said units, and a machine for reading said document comprising a single magnetic sensing device for sequentially sensing each of said linear arrays to produce respective different electric signals therefrom, means having its input coupled to the output of said sensing device for producing a regularly recurring, predetermined number of pulses in response to an input thereto, and means for producing an output in response to the coincidental application thereto of a portion of each of said electric signals and said recurring pulses, whereby a pulse train is produced which is substantially synchronous with the output of said sensing device and which represents a sensed unit in binary form, each different array of magnetic bars providing a different pulse train.

5. A document reading system including in combination a document comprising a non-magnetizable support bearing information units printed thereon, each of said units being allotted substantially equal widths on said support, a portion of each of said units being configured so as to be readily visually identifiable as a conventional alphabetic or numeric character, a second portion of each of said units comprising a linear array of a plurality of substantially vertical, spaced magnetic ink bars of substantially uniform breadths adapted to be sequentially sensed by a single magnetic sensing device, each of said bars being positioned in one of a predetermined number of equispaced positions within said widths, each of said widths having a magnetic bar at the first position sensed by said device and at least one other bar at one of the other of said positions; and a machine for reading said document comprising a device for sequentially sensing said magnetic arrays to produce respective different electric signals therefrom, means having its input coupled to the output of said sensing device for producing a regularly recurring, predetermined number of pulses in response to an input thereto, and means for producing an output in response to the coincidental application thereto of a portion of said electric signal and one of said recurring pulses, whereby a pulse train is produced which is substantially synchronous with the output of said sensing device and which represents a sensed unit in binary form, each different magnetic array providing a different pulse train.

6. The document reading system defined in claim 4 wherein said bar located in said first position to be sensed in each information unit and alternate positions thereafter provide a first substantially linear array, and bars located in the other positions of the information element provide a second substantially linear array, said first and said second linear array being substantially parallel to each other.

7. The document reading system defined in claim 5 wherein said bar located in said first position and bars in alternate positions thereafter form a first substantially linear array and bars located in said other position form a second substantially linear array, said first and said second linear arrays being substantially parallel to each other.

8. A machine for reading a document having a non-magnetizable support bearing information units printed thereon, each of said units comprising first and second portions, said first portion of each unit configured so each would be visually identifiable as a conventional alphabetic or numeric character, said second portion of each unit comprising at least one additional indicium, at least said second portion being printed in magnetic ink to provide an array of vertical magnetic areas adapted to be sequentially sensed by a single magnetic sensing device, each unit having a discrete array different from the array of any other unit comprising a device for sensing the magnetically printed portion of said information units and for producing an electric wave therefrom, wave-shaping means coupled to the output of said sensing device for producing a train of substantially rectangular pulses of chosen amplitude in response to the input thereto of said wave, each excursion of said electric wave of a predetermined amplitude from a reference level providing a separate pulse, means connected to said wave shaping means for differentiating said pulses applied thereto, timing means connected to said differentiating means for producing in response to the first of said differentiated pulses of a chosen polarity, a predetermined number of peaked pulses of uniform polarity, pulse forming means coupled to the output of said differentiating means, said pulse forming means producing, in response to a differentiated pulse of a chosen polarity, a substantially rectangular output pulse of said uniform polarity and having a predetermined duration, each of said rectangular pulses produced by said pulse forming means corresponding to the presence of a magnetic area on said document, and gate means coupled to said timing means and to said pulse forming means for producing an output upon the coincident input thereto of the outputs of said pulse forming means and said timing means whereby a series of pulses is produced which is substantially synchronous with the output from said sensing device and which represents a sensed unit in binary form, each different array of magnetic areas providing a different pulse train.

9. The machine defined in claim 8 wherein said wave shaping means comprises an amplifier stage having its input coupled to the output of said sensing device, an amplitude discriminator stage having its input coupled to the output of said amplifier stage for passing chosen portions of the amplified signal applied thereto, the output from said amplitude discriminator stage being substantially rectangular waves of a predetermined amplitude from a reference level, each such wave corresponding to one of said magnetic ink areas detected by said sensing device, a differentiating stage having its input coupled to the output of said amplitude discriminator stage for producing differentiated pulses of a first polarity coincident with the leading edges of said rectangular waves applied thereto and of a second polarity coincident with the trailing edges of said rectangular waves, and unidirectional means coupled to the output of said differentiating stage for removing the differentiated output signals of a predetermined polarity, whereby a differentiated pulse of a chosen polarity is produced corresponding to each sensed magnetic area of said document, and substantially coincident with the detection of the effective center of each of said magnetic areas by said sensing device.

10. The apparatus defined in claim 8 wherein said timing means comprises delay means including a one-shot multivibrator having its input coupled to the output of said differentiating means, said multivibrator having an astable output of a width equal to approximately one half the width of a pulse produced by said pulse former means, and differentiating means coupled to the output of said multivibrator for producing a differentiated pulse of one polarity substantially coincident with the leading edge of said astable output and a differentiated pulse of the opposite polarity substantially coincident with the trailing edge of said astable output; control means including means coupled to the output of said differentiating means for producing an output therefrom in response to a positive input applied thereto, and a bistable circuit having first and second inputs, said first input being coupled to the output of said last named means, said bistable circuit being switched from one to the other of its two stable states in response to a signal applied to said first input and remaining in said other stable state until a signal is applied to said second input; and a clock circuit including a free-running multivibrator having its input coupled to the output of said bistable circuit for producing regularly recurring output signals of a width substantially equal to the width of a pulse produced by said pulse former means when said bistable circuit is in said other stable state, and means coupled to the output of said free-running multivibrator for producing a differentiated pulse substantially coincident with the leading edge of each of said regularly recurring outputs, whereby each of said differentiated pulses from said last named means occurs in time at the approximate center of each possible output from said pulse former means.

11. The device defined in claim 8 and further including mixer means coupling said pulse former means to said gate means, said pulse former means comprising first and second means for producing substantially rectangular output pulses of first and second respective durations, the output of said differentiating means being coupled to the input of said first means, the output of said first means being applied as an input to said mixer means and also being applied as an input to said second means, the output from said second means being applied as an input to said mixer means, the output pulse from said mixer means produced in response to said inputs, being equal in duration to the sum of said first and second durations, said sum being selected so that each output pulse from said mixer has a duration substantially equal to the time of sensing one of said magnetic areas.

References Cited in the file of this patent

UNITED STATES PATENTS

| | | |
|---|---|---|
| 2,561,476 | Lang | July 24, 1951 |
| 2,751,433 | Linger | June 19, 1956 |
| 2,781,972 | Chaimowicz | Feb. 19, 1957 |
| 2,784,392 | Chaimowicz | Mar. 5, 1957 |
| 2,788,879 | Rand | Apr. 16, 1957 |
| 2,791,310 | Jones | May 7, 1957 |
| 2,894,798 | Potter | July 14, 1959 |
| 2,897,267 | Prince | July 28, 1959 |
| 2,939,758 | Crosman | June 7, 1960 |
| 2,942,778 | Broido | June 28, 1960 |
| 3,000,000 | Eldredge | Sept. 12, 1961 |